US008837865B2

(12) United States Patent
Konno

(10) Patent No.: US 8,837,865 B2
(45) Date of Patent: Sep. 16, 2014

(54) IMAGE PROCESSING APPARATUS, IMAGE CAPTURING APPARATUS, AND METHOD OF CONTROLLING THE SAME

(71) Applicant: Canon Kabushiki Kaisha, Tokyo (JP)

(72) Inventor: Ryuhei Konno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/774,133

(22) Filed: Feb. 22, 2013

(65) Prior Publication Data

US 2013/0170769 A1    Jul. 4, 2013

Related U.S. Application Data

(63) Continuation of application No. 13/005,367, filed on Jan. 12, 2011, now Pat. No. 8,401,338.

(30) Foreign Application Priority Data

Feb. 5, 2010    (JP) .................................. 2010-024832

(51) Int. Cl.
   *G06K 9/32*    (2006.01)
(52) U.S. Cl.
   USPC .......... 382/296; 382/190; 382/289; 382/291; 358/537; 358/453
(58) Field of Classification Search
   USPC ................ 382/190, 284, 289, 291, 296, 297; 358/537, 452, 453
   See application file for complete search history.

(56) References Cited

U.S. PATENT DOCUMENTS

| 6,208,354 B1 * | 3/2001 | Porter ........................... 345/634 |
| 6,275,718 B1 * | 8/2001 | Lempert ....................... 600/407 |
| 6,501,515 B1 * | 12/2002 | Iwamura ....................... 348/734 |
| 6,538,675 B2 * | 3/2003 | Aratani et al. ................ 715/856 |
| 6,727,909 B1 * | 4/2004 | Matsumura et al. .......... 345/629 |

(Continued)

FOREIGN PATENT DOCUMENTS

| JP | 2005-286940 A | 10/2005 |
| JP | 2007-199757 A | 8/2007 |

(Continued)

OTHER PUBLICATIONS

Sep. 20, 2013 Japanese Office Action, which is enclosed without an English Translation, that issued in Japanese Patent Application No. 2010-024832.

(Continued)

*Primary Examiner* — Yosef Kassa
(74) *Attorney, Agent, or Firm* — Cowan, Liebowitz & Latman, P.C.

(57) ABSTRACT

The present invention provides an image processing apparatus for performing image processing of image data in which information specifying, on a first coordinate system, a position of a portion of interest in an image is recorded, including an image processing unit configured to perform rotation processing of the image data using a second coordinate system having an origin different from that of the first coordinate system, and a change unit configured to change the information specifying the position of the portion of interest in accordance with a rotation amount of the image data by the rotation processing such that an image of the portion of interest specified by the information specifying the position of the portion of interest after the rotation processing matches that before the rotation processing.

34 Claims, 5 Drawing Sheets

(56) References Cited

U.S. PATENT DOCUMENTS

| | | | |
|---|---|---|---|
| 6,874,420 B2* | 4/2005 | Lewis et al. | 101/485 |
| 6,983,886 B2* | 1/2006 | Natsukari et al. | 235/462.1 |
| 7,148,909 B2* | 12/2006 | Yui et al. | 345/660 |
| 7,766,486 B2* | 8/2010 | Sakai | 353/69 |
| 8,289,401 B2* | 10/2012 | Pinto et al. | 348/208.12 |
| 8,402,490 B2* | 3/2013 | Hoffberg-Borghesani et al. | 725/46 |
| 8,432,489 B2* | 4/2013 | Arseneau et al. | 348/461 |
| 8,440,955 B2* | 5/2013 | Ivashin | 250/208.1 |
| 8,484,001 B2* | 7/2013 | Glozman et al. | 703/6 |
| 2004/0052431 A1* | 3/2004 | Locker et al. | 382/296 |

FOREIGN PATENT DOCUMENTS

| | | |
|---|---|---|
| JP | 2009-065635 A | 3/2009 |
| JP | 2009-124314 A | 6/2009 |
| JP | 2009-296031 A | 12/2009 |

OTHER PUBLICATIONS

Dec. 20, 2013 Japanese Office Action, is enclosed without an English Translation, that issued in Japanese Patent Application No. 2010-024832.

* cited by examiner

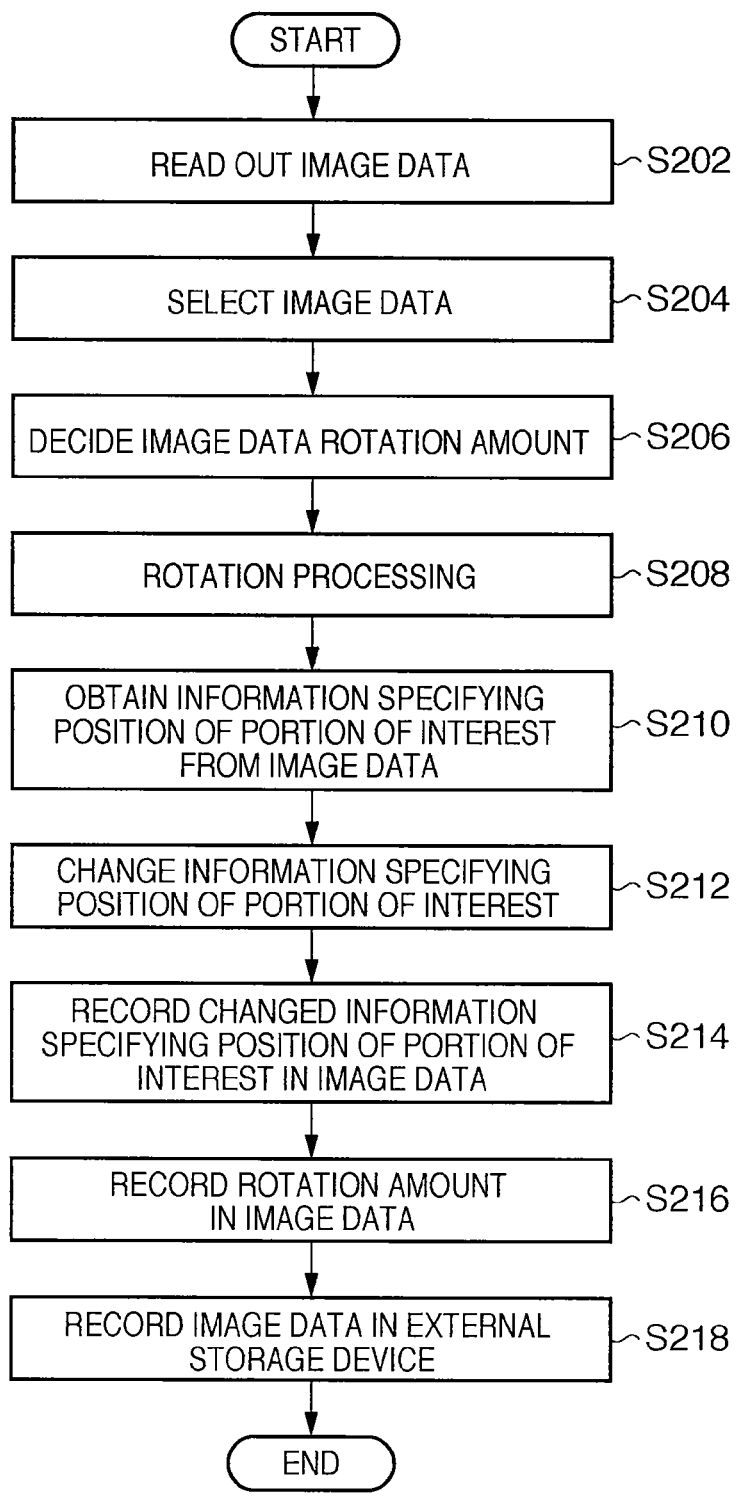

IMAGE PROCESSING APPARATUS, IMAGE CAPTURING APPARATUS, AND METHOD OF CONTROLLING THE SAME

CROSS-REFERENCE TO RELATED APPLICATIONS

This application is a continuation of application Ser. No. 13/005,367, filed Jan. 12, 2011 the entire disclosure of which is hereby incorporated by reference.

BACKGROUND OF THE INVENTION

1. Field of the Invention

The present invention relates to an image processing apparatus, image capturing apparatus, and method of controlling the same.

2. Description of the Related Art

There is known a function of, when reproducing (displaying) an image captured by an image capturing apparatus on an image processing apparatus (image processing application software), displaying distance measuring frames (to be referred to as "AF frames" hereinafter) used for auto focus (AF) at the time of image capturing. For example, Japanese Patent Laid-Open No. 2000-125178 proposes a technique of recording, in an image (image data), the position information of an AF frame (to be referred to as an "in-focus AF frame" hereinafter) used to bring an object into focus and displaying the in-focus AF frame at the time of image reproduction to facilitate confirming image focus. This technique also allows to automatically enlarge the image in the in-focus AF frame.

On the other hand, an image captured by the image capturing apparatus sometimes tilts in the horizontal direction due to the influence of the posture of the image capturing apparatus. Rotation processing of rotating the captured image to correct the tilt has been proposed as one of image processes.

However, when the image is rotated, and the in-focus AF frame is displayed directly using the position information of the AF frame recorded in the image, the in-focus AF frame is displayed in the rotated image at a position shifted from the actual in-focus AF frame position.

The problem of the prior art will be described in detail with reference to FIGS. 5A and 5B. FIG. 5A is a view showing a display example in which an in-focus AF frame is displayed in an image IM1 (that is, an image before rotation processing) that tilts in the horizontal direction. Referring to FIG. 5A, nine rectangular frames represent AF frames FL1 selectable at the time of image capturing. Out of the nine rectangular frames, a rectangular frame indicated by a bold line represents an in-focus AF frame FL2 used to focus on (the face of) an object OB by the AF function.

FIG. 5B is a view showing a display example in which the in-focus AF frame is displayed in an image IM2 obtained by performing rotation processing for the image IM1 shown in FIG. 5A so as to set the object OB in a horizontal position. Referring to FIG. 5B, an image IM3 is obtained by cutting out, from the image IM2 after the rotation processing, a region inscribed in the image region of the image IM2 not to include any image region absent in the image IM1 before the rotation processing. The position of the object OB in the image IM2 that has undergone the rotation processing is shifted from its position in the image IM1 before the rotation processing. The AF frames FL1 and the in-focus AF frame FL2 are displayed in the image IM3 using position information cut out upon cutting out the image IM3 from the image IM2.

As described above, when the AF frames FL1 and the in-focus AF frame FL2 are displayed in the image IM3 directly using the position information recorded in the image IM1, the in-focus AF frame FL2 is displayed at a position shifted from the position of the face of the object OB (actual in-focus AF frame position) in the image IM3.

SUMMARY OF THE INVENTION

The present invention provides a technique capable of displaying, in an image after rotation processing, a portion of interest at the same position as that in the image before the rotation processing.

According to one aspect of the present invention, there is provided an image processing apparatus for performing image processing of image data in which information specifying, on a first coordinate system, a position of a portion of interest in an image is recorded, comprising: an image processing unit configured to perform rotation processing of the image data using a second coordinate system having an origin different from that of the first coordinate system; and a change unit configured to change the information specifying the position of the portion of interest in accordance with a rotation amount of the image data by the rotation processing such that an image of the portion of interest specified by the information specifying the position of the portion of interest after the rotation processing matches that before the rotation processing.

Further aspects of the present invention will become apparent from the following description of exemplary embodiments with reference to the attached drawings.

BRIEF DESCRIPTION OF THE DRAWINGS

FIG. 2 is a flowchart for explaining image data rotation processing in the image capturing apparatus shown in FIG. 1.

DESCRIPTION OF THE EMBODIMENTS

Figure 1:
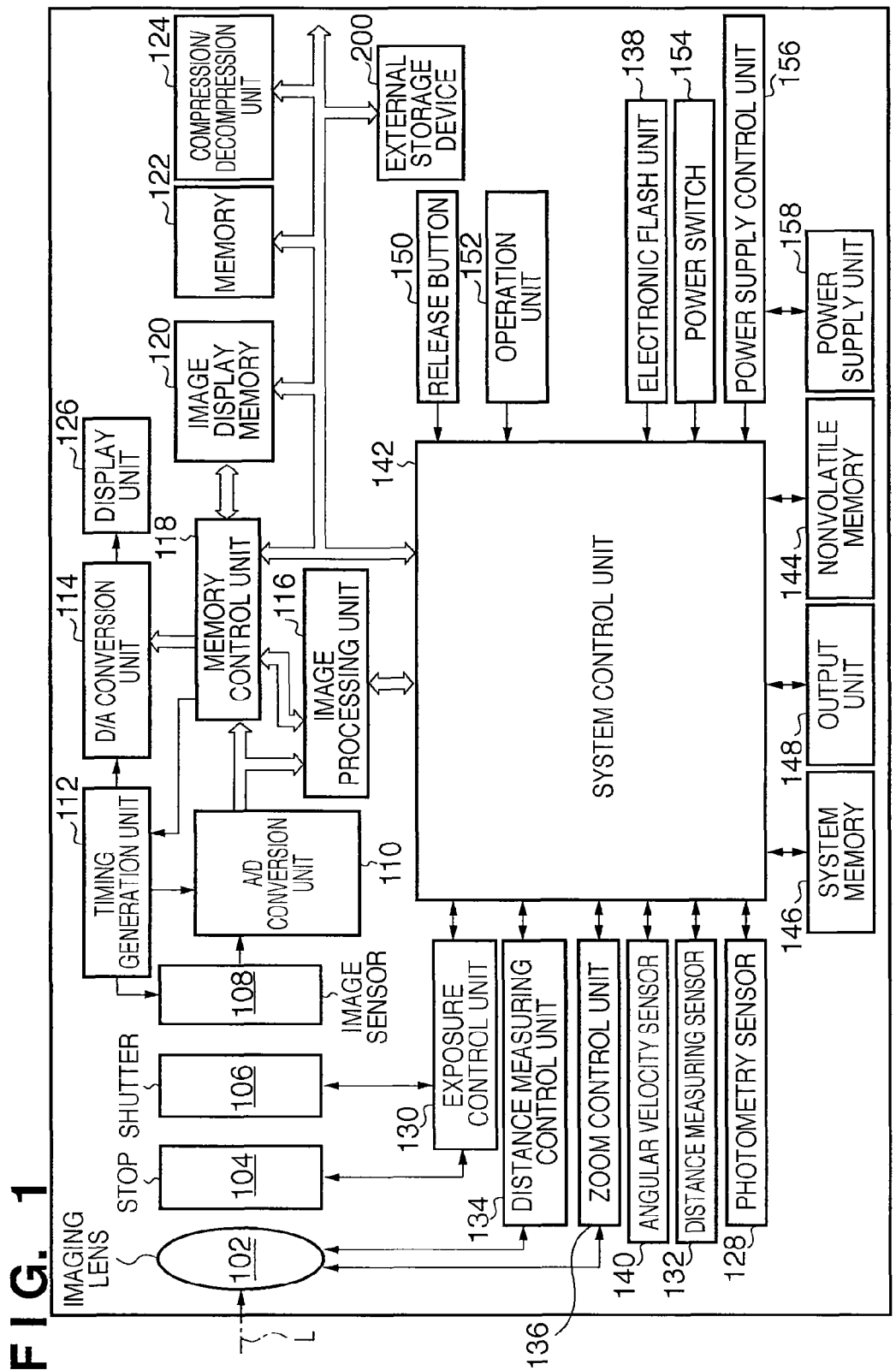
FIG. 1 is a schematic block diagram showing an image capturing apparatus according to an embodiment of the present invention.

Preferred embodiments of the present invention will be described below with reference to the accompanying drawings. Note that the same reference numerals denote the same members throughout the drawings, and a repetitive description thereof will not be given.

FIG. 1 is a schematic block diagram showing an image capturing apparatus 100 according to an embodiment of the present invention. The image capturing apparatus 100 is an image capturing apparatus for capturing an object and is implemented as a digital camera in this embodiment. The image capturing apparatus 100 records image data corresponding to a captured image in an external storage device 200 connected to the image capturing apparatus 100, and also displays (reproduces) an image corresponding to image data recorded in the external storage device 200.

An imaging lens 102 forms an image of light L from an object (that is, forms an optical image) on the imaging plane of an image sensor 108. The image sensor 108 is formed from, for example, a CCD or CMOS device (photoelectric conversion device), and converts an optical image formed through the imaging lens 102, stop 104, and shutter 106 into an electrical signal. An A/D conversion unit 110 converts an analog signal (analog data) output from the image sensor 108 into a digital signal (digital data). A timing generation unit 112 supplies clock signals and control signals to the image sensor 108, A/D conversion unit 110, and D/A conversion unit 114 and controls their operations under the control of a memory control unit 118 and a system control unit 142.

An image processing unit 116 performs various kinds of processing for data input from the A/D conversion unit 110 or data input from the memory control unit 118. For example, the image processing unit 116 performs white balance processing, color correction processing, rotation processing, dust detection processing of detecting dust sticking to the image sensor 108, dust erase processing of making such dust unnoticeable, and the like. Note that rotation processing rotates image data using a coordinate system (second coordinate system) having an origin different from that of the coordinate system (first coordinate system) of the image data before rotation processing so as to correct a tilt.

The memory control unit 118 controls the A/D conversion unit 110, timing generation unit 112, D/A conversion unit 114, image processing unit 116, image display memory 120, memory 122, and compression/decompression unit 124. The digital signal A/D-converted by the A/D conversion unit 110 is recorded (written) in the image display memory 120 or the memory 122 via the image processing unit 116 and the memory control unit 118 or via the memory control unit 118.

The image display memory 120 stores image data corresponding to an image displayed on a display unit 126. The memory 122 stores image data (for example, still image data and moving image data captured by the image capturing apparatus 100), and has a storage capacity capable of storing a predetermined number of image data. The memory 122 is also usable as the work area of the image processing unit 116 or the system control unit 142.

The compression/decompression unit 124 reads out image data from the memory 122 and compresses it, or reads out compressed image data from the memory 122 and decompresses it, and records the processed image data in the memory 122.

The display unit 126 includes a TFT (Thin Film Transistor) or an LCD (Liquid Crystal Display), and displays, via the D/A conversion unit 114, an image corresponding to image data stored in the image display memory 120. The display unit 126 also displays various kinds of menu screens (for example, a menu screen to be used to set rotation processing) to control the image capturing apparatus 100. Display of these menu screens or setting and selection on the menu screens are done by a user operation on an operation unit 152.

A photometry sensor 128 detects the luminance of each pixel conjugate to the imaging plane of the image sensor 108 and inputs it to the system control unit 142. The system control unit 142 calculates an appropriate exposure amount corresponding to the detection result of the photometry sensor 128. An exposure control unit 130 controls the stop 104 and the shutter 106 based on the exposure amount calculated by the system control unit 142.

A distance measuring sensor 132 detects the distance information of a distance measuring point (AF frame) arbitrarily selected by the user. However, the distance measuring point need not always be arbitrarily selected by the user, and may be set to automatically focus on an object in the shortest distance based on the detection result of the distance measuring sensor 132. A distance measuring control unit 134 controls focusing of the imaging lens 102 based on the detection result of the distance measuring sensor 132.

A zoom control unit 136 detects the zooming amount (focal length) of the imaging lens 102 manually operated by the user. When the imaging lens 102 automatically zooms, the zoom control unit 136 controls the zooming amount of the imaging lens 102. An electronic flash unit 138 has an AF auxiliary light projecting function and an electronic flash brightness control function. An angular velocity sensor 140 detects horizontal and vertical shakes of the image capturing apparatus 100, and is used for camera shake correction processing or portrait/landscape image capturing determination.

The system control unit 142 controls the entire image capturing apparatus 100. The system control unit 142 executes programs stored in a nonvolatile memory 144 to execute the processing of this embodiment. The nonvolatile memory 144 is a memory capable of electrically erasing and recording data and includes, for example, an EEPROM. The nonvolatile memory 144 stores constants and programs (programs to be used to execute various flowcharts to be described later) for the operation of the system control unit 142. A system memory 146 is formed from, for example, a RAM and rasterizes the constants and variables for the operation of the system control unit 142 and programs read out from the nonvolatile memory 144.

An output unit 148 includes a display device which displays the operation states of the image capturing apparatus 100 and messages by texts or images and a speaker which outputs them by voices in accordance with program execution in the system control unit 142. The output unit 148 displays single shooting/sequential shooting, timer, compression ratio, number of recording pixels, number of recorded images, and number of recordable images. The output unit 148 also displays the shutter speed, F-number, exposure compensation, battery level, error, and the attached/detached state of the external storage device 200.

A release button 150 is used to instruct to capture an object and includes a first switch and a second switch. When the release button 150 is operated (pressed) halfway, the first switch is turned on to supply a signal for starting photometry processing or distance measuring processing to the system control unit 142. When the release button 150 is operated (pressed) fully, the second switch is turned on to supply a signal for starting exposure processing to the system control unit 142.

The operation unit 152 includes setting buttons, selection buttons, and a touch panel provided on the display unit 126, and has a function of accepting user operations (inputting various kinds of instructions to the system control unit 142). The operation unit 152 is used for, for example, single shooting/sequential shooting/self timer switching and setting of the shutter speed, F-number, and exposure compensation.

A power switch 154 is used to switch the power state of the image capturing apparatus 100 between an ON state and an OFF state. A power supply control unit 156 includes a battery detection circuit, DC/DC converter, and switching circuit for switching a block to be energized, and detects the presence/absence of a battery attached to a power supply unit 158, the type of battery, and the battery level. Additionally, the power supply control unit 156 controls the DC/DC converter based on the detection result in the power supply unit 158 and an instruction from the system control unit 142 so as to supply a necessary voltage to the units of the image capturing apparatus 100 including the external storage device 200 during a necessary period. The power supply unit 158 detachably holds a primary cell such as an alkaline cell or a lithium cell, a secondary cell such as an NiCd cell, NiMH cell, or Li cell, or an AC adapter, and outputs a voltage (DC voltage).

The external storage device 200 is a storage medium detachable from the image capturing apparatus 100, and includes a CF (Compact Flash®) card and an SD card. Image data temporarily recorded in the memory 122 is finally recorded in the external storage device 200.

Various kinds of processing (operations) of the image capturing apparatus 100 will be described below. Rotating an image corresponding to image data recorded in the external storage device 200, that is, image data rotation processing in the image capturing apparatus 100 will be described first with reference to FIG. 2. Image data recorded in the external storage device 200 can be either image data generated by the image capturing apparatus 100 or image data generated by another image capturing apparatus. Information specifying (on the first coordinate system) the position of a portion of interest in the image is recorded in (the image header field of) the image data.

In step S202, the system control unit 142 reads out image data from the external storage device 200 to the image display memory 120. At this time, the system control unit 142 displays, on the display unit 126, an image corresponding to the image data read out to the image display memory 120. The image displayed on the display unit 126 can be switched by a user operation (for example, a user operation on the operation unit 152 to input an image switching instruction). That is, upon receiving an image switching instruction, the system control unit 142 reads out another image data from the external storage device 200 to the image display memory 120 and displays an image corresponding to the image data on the display unit 126.

In step S204, the system control unit 142 selects process target image data to be subjected to rotation processing from the image data read out in step S202 in accordance with a user operation (for example, a user operation on the operation unit 152 to input an image selection instruction).

In step S206, the system control unit 142 decides the image data rotation amount of image processing (image data rotation amount necessary for correcting the tilt of the image). For example, the system control unit 142 decides the image data rotation amount in accordance with a user operation. At this time, the system control unit 142 instructs the image processing unit 116 to rotate the image data based on the rotation amount input by the user and displays, on the display unit 126, an image corresponding to the image data rotated by the image processing unit 116. Hence, the user can confirm the image displayed on the display unit 126 while increasing/decreasing the image data rotation amount to be input and finally decide the image data rotation amount.

In step S208, the system control unit 142 instructs the image processing unit 116 to perform rotation processing of the image data selected in step S204 based on the rotation amount decided in step S206 so that the image processing unit 116 performs image data rotation processing. Note that the image data rotation processing can be implemented by a rotation processing algorithm known to those skilled in the art, and a detailed description thereof will be omitted.

In step S210, the system control unit 142 obtains, from the image data selected in step S204, information specifying the position of a portion of interest in the image. Examples of the portion of interest are a portion corresponding to a distance measuring frame (AF frame) for auto focus, a portion corresponding to the face (including eyes, nose, and mouth) of an object detected by face detection processing, and a portion corresponding to a dust particle sticking to the image sensor 108 and detected by dust detection processing. Note that the AF frames include at least one of an AF frame selectable upon generating image data and an AF frame (in-focus AF frame) used to bring the object into focus at the time of image data generation.

In step S212, the system control unit 142 changes the information specifying the position of the portion of interest in accordance with the rotation amount decided in step S206 such that the image of the portion of interest specified by the information specifying the position of the portion of interest after the rotation processing (S208) matches that before the rotation processing.

Figure 5A:
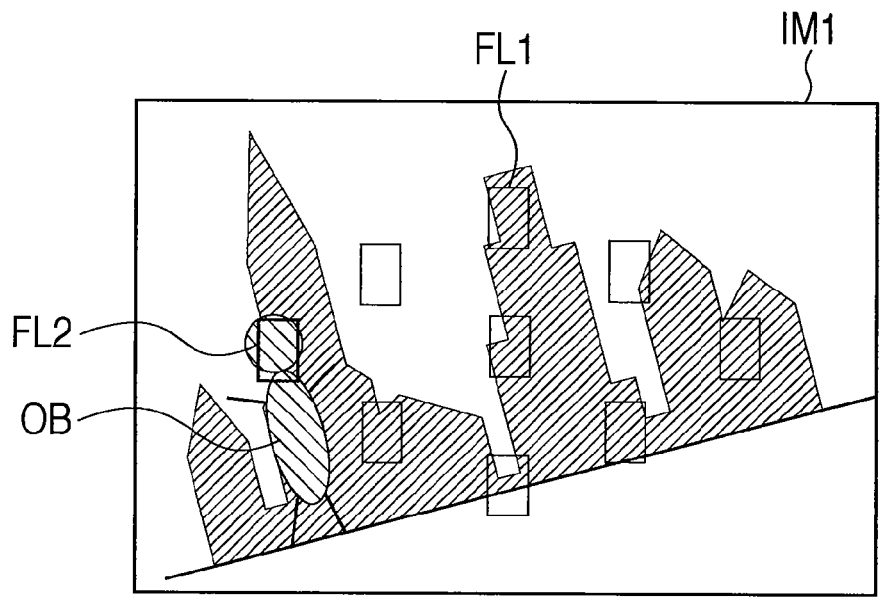
FIGS. 5A and 5B are views for explaining a problem of a prior art.
Figure 5B:
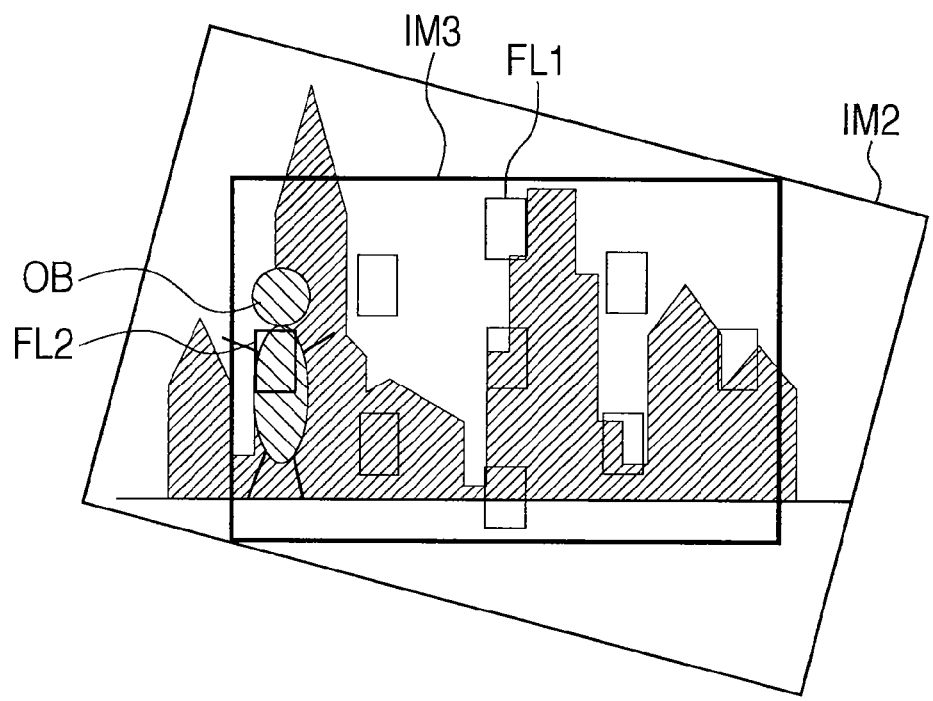

Step S212 will be described in detail. Assume that the portion of interest is an AF frame selectable upon image data generation or an in-focus AF frame used to bring the object into focus at the time of image data generation. The AF frame generally has a rectangular shape, as shown in FIGS. 5A and 5B. Hence, in this embodiment, the information specifying the position of the portion of interest, that is, the AF frame includes four coordinate points representing the positions of the four vertices of the rectangular shape of the AF frame so as to represent the position and size of the AF frame. Note that the information specifying the position of the AF frame may be one coordinate point representing the position of one point (for example, one of the four vertices of the rectangular shape or the central point of the rectangular shape) included in the AF frame (distance measuring frame). In this case, however, the image data needs to record information representing the rectangular shape based on the one coordinate point. If there are nine AF frames selectable in the image capturing apparatus at the time of image data generation, as shown in FIGS. 5A and 5B, the above-described four coordinate points representing the positions of four vertices are included for each of the nine AF frames.

The system control unit 142 obtains the above-described four coordinate points representing the positions of the four vertices (S210), and changes the four coordinate points serving as the information specifying the position of the portion of interest by the same processing as the image data rotation processing of the image processing unit 116. This allows to display the AF frame at the actual AF frame position (the position of the AF frame in the image before the rotation processing) even in the image that has undergone the rotation processing.

In step S214, the system control unit 142 records the information specifying the position of the portion of interest, which is changed in step S212, in (the image header field of) the image data.

Figure 3A:
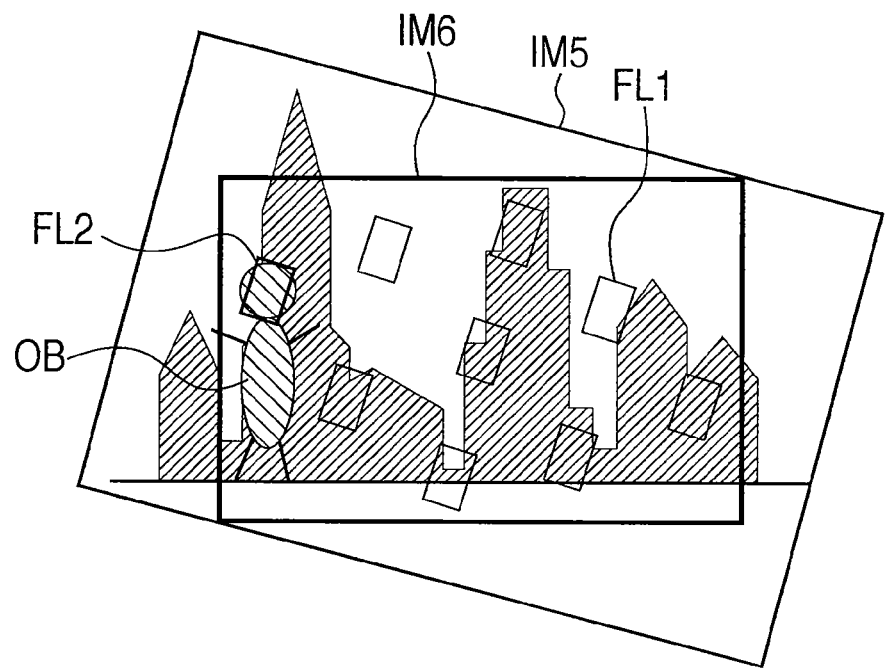
FIGS. 3A and 3B are views showing display examples in which AF frames are displayed in an image obtained by performing rotation processing for an image shown in FIG. 5A so as to set an object in a horizontal position according to the embodiment.

Note that in this embodiment, the information specifying the position of an AF frame serving as a portion of interest includes four coordinate points representing the positions of the four vertices of the rectangular shape of the AF frame, and each of the four coordinate points is changed based on the rotation amount decided in step S206 and recorded in the image data. Hence, each AF frame is displayed in the rotated image using the four coordinate points recorded in step S214, as shown in FIG. 3A. FIG. 3A is a view showing a display example in which AF frames FL1 and an in-focus AF frame FL2 are displayed in an image IM5 obtained by performing rotation processing for an image IM1 shown in FIG. 5A so as to set an object OB in a horizontal position. Referring to FIG. 3A, an image IM6 is obtained by cutting out, from the image IM5 after the rotation processing, a region inscribed in the image region of the image IM5 not to include any image region absent in the image IM1 before the rotation processing. Note that when cutting out the image, the information specifying the position of the portion of interest recorded in the image data is also shifted in accordance with image cutout. As shown in FIG. 3A, each of the AF frames FL1 and the in-focus AF frame FL2 is displayed in the image IM5 using the four coordinate points changed based on the rotation amount decided in step S206. Hence, the AF frames FL1 and the in-focus AF frame FL2 are displayed at the actual positions (the positions of the AF frames in the image before the rotation processing) in a state rotated based on the rotation amount.

Figure 3B:
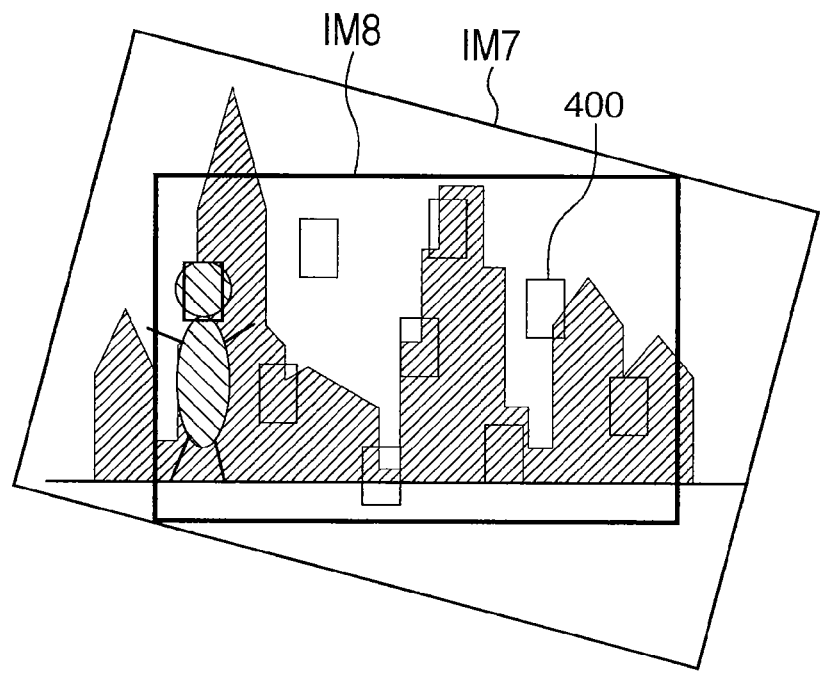

On the other hand, when the information specifying the position of an AF frame includes one coordinate point representing the position of one point included in the AF frame, only the one coordinate point is changed based on the rotation amount decided in step S206 and recorded in the image data. Hence, each AF frame is displayed in the rotated image using the one coordinate point recorded in step S214 and information representing the rectangular shape based on the one coordinate point recorded in the image, as shown in FIG. 3B. FIG. 3B is a view showing a display example in which the AF frames FL1 and the in-focus AF frame FL2 are displayed in an image IM7 obtained by performing rotation processing for the image IM1 shown in FIG. 5A so as to set the object OB in a horizontal position. Referring to FIG. 3B, an image IM8 is obtained by cutting out, from the image IM7 after the rotation processing, a region inscribed in the image region of the image IM7 not to include any image region absent in the image IM1 before the rotation processing. As shown in FIG. 3B, each of the AF frames FL1 and the in-focus AF frame FL2 is displayed in the image IM7 using the one coordinate point changed based on the rotation amount decided in step S206 and the information representing the rectangular shape based on the one coordinate point. Hence, the AF frames FL1 and the in-focus AF frame FL2 are displayed at the actual positions (the positions of the AF frames in the image before the rotation processing). However, since the information representing the rectangular shape based on one coordinate point has not changed based on the rotation processing (rotation amount), the AF frames FL1 and the in-focus AF frame FL2 are displayed in the image IM7 without being rotated, resulting in display with a sense of incongruity. To display rotated AF frames in the rotated image, the system control unit 142 records the rotation amount decided in step S206 in (the image header field of) the image data in step S216. This enables to display the AF frames rotated based on the rotation amount decided in step S206. Note that when the information specifying the position of an AF frame includes four coordinate points representing the positions of the four vertices of the rectangular shape of the AF frame, the AF frame can be displayed while being rotated using the four coordinate points recorded in step S214, as described above. Hence, recording the rotation amount decided in step S206 in the image data, that is, step S216 needs not be performed.

In step S218, the system control unit 142 records, in the external storage device 200, the image data which has recorded the information specifying the position of the portion of interest, which is changed in step S212, (and the rotation amount decided in step S206).

Note that in this embodiment, rotation processing of image data recorded in the external storage device 200 has been described. However, the present invention is not limited to this. For example, rotation processing may be performed before recording image data in the external storage device 200. In this case, the image data rotation amount is decided using the detection result of the angular velocity sensor 140, and information specifying the position of the portion of interest is changed based on the rotation amount and recorded in the image data, as described above.

Figure 4:
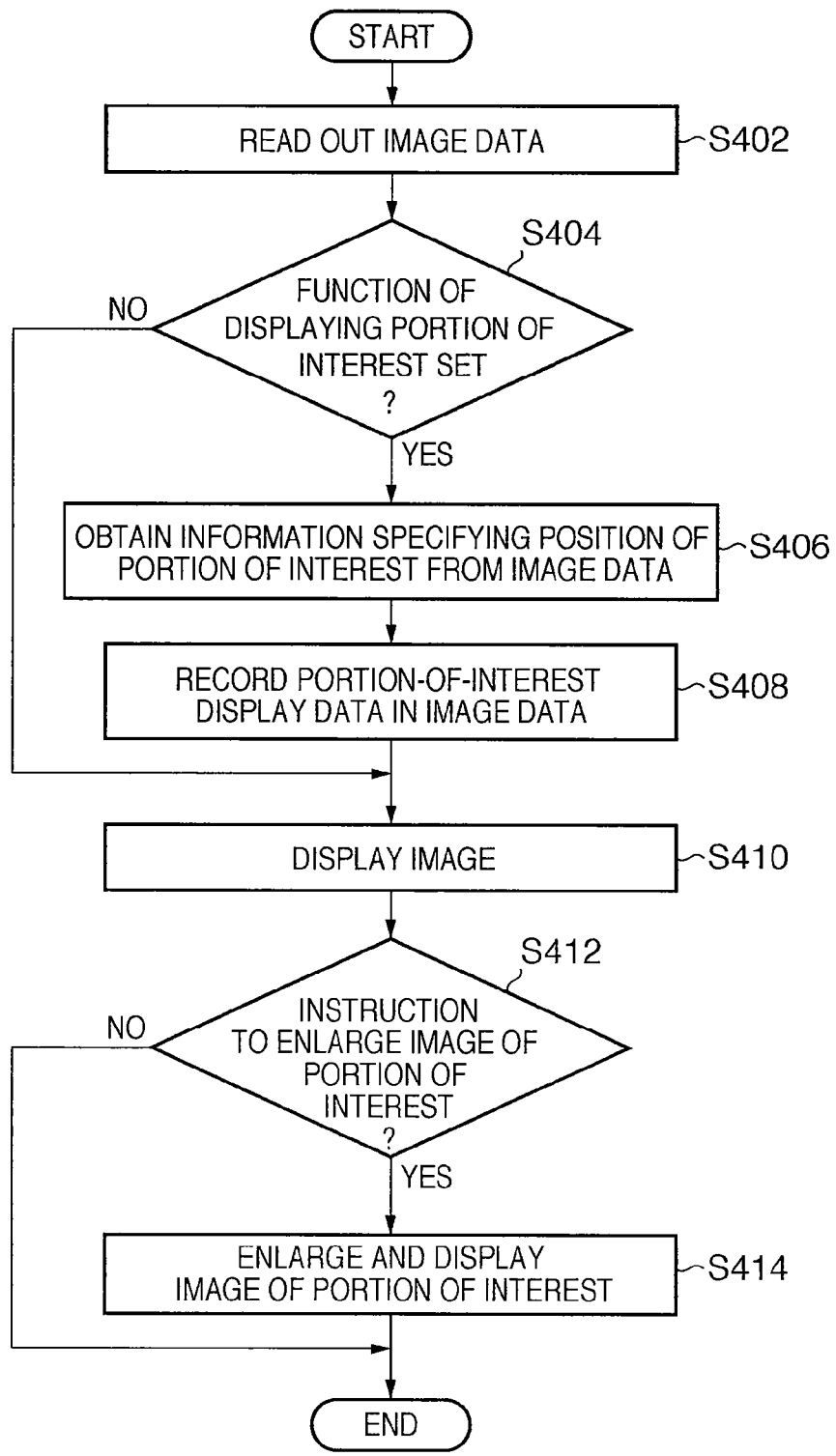
FIG. 4 is a flowchart for explaining display control processing in the image capturing apparatus shown in FIG. 1.

Reading out image data stored in the external storage device 200 and displaying an image corresponding to the image data on the display unit 126, that is, display control processing in the image capturing apparatus 100 will be described next with reference to FIG. 4.

In step S402, the system control unit 142 reads out image data from the external storage device 200 to the image display memory 120.

In step S404, the system control unit 142 determines whether a function of displaying a portion of interest (for example, AF frame) of the image is set. The function of displaying the portion of interest of the image is set by a user operation on the operation unit 152. When the function of displaying the portion of interest of the image is set, for example, a portion-of-interest display function flag is validated. The system control unit 142 can determine, by referring to the portion-of-interest display function flag, whether the function of displaying the portion of interest of the image is set. If the function of displaying the portion of interest of the image is set, the process advances to step S406. If the function of displaying the portion of interest of the image is not set, the process advances to step S410.

In step S406, the system control unit 142 obtains information specifying the position of the portion of interest from the image data read out in step S402. If the image data rotation amount and other information (for example, information representing a rectangular shape based on one coordinate point) are recorded in the image data, these pieces of information are also obtained.

In step S408, the system control unit 142 generates portion-of-interest display data (for example, data representing a rectangular AF frame serving as the portion of interest) based on the information specifying the position of the portion of interest obtained in step S406 and records it in (the image header field of) the image data. If the image data rotation amount and other information have also been obtained in step S406, the portion-of-interest display data is generated based on the information specifying the position of the portion of interest, the rotation amount, and other information.

In step S410, the system control unit 142 displays the image on the display unit 126. If the function of displaying the portion of interest of the image is not set, the image corresponding to the image data read out in step S402 is directly displayed (that is, the portion of interest is not displayed). On the other hand, if the function of displaying the portion of interest of the image is set, the image corresponding to the image data read out in step S402 is displayed. In addition, the portion of interest corresponding to the portion-of-interest display data recorded in step S408 is displayed in the image. In this case, even when the image data has undergone rotation processing, the information specifying the position of the portion of interest recorded in the image data is changed based on the image data rotation amount, as described above. Hence, as shown in FIG. 3A, the portion of interest can be displayed at the actual position in the image after the rotation processing while being rotated based on the image data rotation amount.

In step S412, the system control unit 142 determines whether an instruction is input to enlarge the image of the portion of interest in the image displayed in step S410. Note that the instruction to enlarge the image of the portion of interest is input by a user operation on the operation unit 152. If the instruction to enlarge the image of the portion of interest is not input, the display control processing ends. On the other hand, if the instruction to enlarge the image of the portion of interest is input, the system control unit 142 enlarges the image of the portion of interest and displays it in step S414. Any enlarging method known to those skilled in the art is applicable to enlarge the image of the portion of interest, and a detailed description thereof will be omitted.

Note that if the portion of interest is a portion corresponding to a dust particle sticking to the image sensor 108, the system control unit may determine in step S412 whether a dust erase processing instruction is input so that dust erase processing is performed in step S414.

As described above, according to the image capturing apparatus 100 of this embodiment, when performing rotation processing of image data, information specifying the position of a portion of interest, which is recorded in the image data, is also changed based on the image data rotation amount. This makes it possible to display, in an image after rotation processing, a portion of interest at the same position as that in the image before the rotation processing.

In this embodiment, image data rotation processing in an image capturing apparatus has been described. However, the present invention is not limited to this. The present invention can also be implemented in an image processing apparatus (image processing application software) such as a personal computer.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-024832 filed on Feb. 5, 2010, which is hereby incorporated by reference herein in its entirety.

What is claimed is:

1. An image processing apparatus for performing image processing of image data in which information specifying a position of a portion of interest in an image is recorded, comprising:
    an image processing unit configured to perform rotation processing of the image data;
    a change unit configured to change the information specifying the position of the portion of interest in accordance with a rotation amount of the image data by the rotation processing such that an image of the portion of interest specified by the information specifying the position of the portion of interest after the rotation processing is corresponding to that before the rotation processing,
    wherein the portion of interest is corresponding to a portion which was used to prepare for taking the image.

2. The apparatus according to claim 1, wherein the change unit changes the information specifying the position of the portion of interest in accordance with a rotation amount of the image data by the rotation processing.

3. The apparatus according to claim 1, further comprising a display control unit configured to control to display the image of the portion of interest in addition to displaying an image corresponding to the image data.

4. The apparatus according to claim 1, wherein
    the image data is generated by an image capturing apparatus, and
    the portion of interest is a portion corresponding to a frame for auto focus, the frame is selectable in the image capturing apparatus upon generating the image data.

5. The apparatus according to claim 1, wherein
    the image data is generated by an image capturing apparatus, and
    the portion of interest is a portion corresponding to a frame for auto focus, the portion is used to focus on an object by the image capturing apparatus upon generating the image data.

6. The apparatus according to claim 1, wherein
    the information specifying the position of the portion of interest has a rectangular shape.

7. The apparatus according to claim 1, further comprising a display control unit configured to, when displaying, on a display unit, an image corresponding to the image data which has undergone the rotation processing, display distance image in according to the position of the portion of interest.

8. The apparatus according to claim 1, further comprising a display control unit configured to control to display the image of the portion of interest,
    wherein said display control unit rotates the frame in accordance with the rotation amount of the image data by the rotation processing.

9. An image capturing apparatus comprising:
    an image capturing unit configured to capture an object to generate image data; and
    an image processing apparatus of claim 1 which performs image processing of the image data generated by said image capturing unit.

10. A method of controlling an image processing apparatus for performing image processing of image data in which information specifying a position of a portion of interest in an image is recorded, comprising:
    performing rotation processing of the image data; and
    changing the information specifying the position of the portion of interest in accordance with a rotation amount of the image data by the rotation processing such that an image of the portion of interest specified by the information specifying the position of the portion of interest after the rotation processing is corresponding to that before the rotation processing,
    wherein the portion of interest is corresponding to a portion which was used to prepare for taking the image.

11. The method according to claim 10, wherein the changing step changes the information specifying the position of the portion of interest in accordance with a rotation amount of the image data by the rotation processing.

12. The method according to claim 10, further comprising controlling to display the image of the portion of interest in addition to displaying an image corresponding to the image data.

13. The method according to claim 10, wherein
    the image data is generated by an image capturing apparatus, and
    the portion of interest is a portion corresponding to a frame for auto focus, the frame is selectable in the image capturing apparatus upon generating the image data.

14. The method according to claim 10, wherein
    the image data is generated by an image capturing apparatus, and the portion of interest is a portion corresponding to a frame for auto focus, the portion is used to focus on an object by the image capturing apparatus upon generating the image data.

15. The method according to claim 10, wherein
the information specifying the position of the portion of interest has a rectangular shape.

16. The method according to claim 10, further comprising, when displaying, on a display unit, an image corresponding to the image data which has undergone the rotation processing, displaying distance image in according to the position of the portion of interest.

17. The method according to claim 10, further comprising controlling to display the image of the portion of interest,
wherein the controlling step rotates the frame in accordance with the rotation amount of the image data by the rotation processing.

18. A non-transitory computer-readable storage medium storing a program for causing a computer to execute a method of controlling an image processing apparatus for performing image processing of image data in which information specifying a position of a portion of interest in an image is recorded, the program causing the computer to execute:
performing rotation processing of the image data; and
changing the information specifying the position of the portion of interest in accordance with a rotation amount of the image data by the rotation processing such that an image of the portion of interest specified by the information specifying the position of the portion of interest after the rotation processing is corresponding to that before the rotation processing,
wherein the portion of interest is corresponding to a portion which was used to prepare for taking the image.

19. The medium according to claim 18, wherein the changing step changes the information specifying the position of the portion of interest in accordance with a rotation amount of the image data by the rotation processing.

20. The medium according to claim 18, wherein the program causing the computer to execute controlling to display the image of the portion of interest in addition to displaying an image corresponding to the image data.

21. The medium according to claim 18, wherein
the image data is generated by an image capturing apparatus, and
the portion of interest is a portion corresponding to a frame for auto focus, the frame is selectable in the image capturing apparatus upon generating the image data.

22. The medium according to claim 18, wherein
the image data is generated by an image capturing apparatus, and
the portion of interest is a portion corresponding to a frame for auto focus, the portion is used to focus on an object by the image capturing apparatus upon generating the image data.

23. The medium according to claim 18, wherein
the information specifying the position of the portion of interest has a rectangular shape.

24. The medium according to claim 18, wherein the program causing the computer to execute, when displaying, on a display unit, an image corresponding to the image data which has undergone the rotation processing, displaying distance image in according to the position of the portion of interest.

25. The medium according to claim 18, wherein the program causing the computer to execute controlling to display the image of the portion of interest,
wherein the controlling step rotates the frame in accordance with the rotation amount of the image data by the rotation processing.

26. An image processing apparatus for performing image processing of image data in which information specifying a position of a portion of interest in an image is recorded, comprising:
an image processing unit configured to perform rotation processing of the image data;
a change unit configured to change the information specifying the position of the portion of interest in accordance with a rotation amount of the image data by the rotation processing such that an image of the portion of interest specified by the information specifying the position of the portion of interest after the rotation processing is corresponding to that before the rotation processing,
wherein the portion of interest is a portion corresponding to a dust particle sticking.

27. The apparatus according to claim 26, wherein
the image data is generated by an image capturing apparatus, and
the portion of interest is a portion corresponding to a dust particle sticking to an image sensor of the image capturing apparatus.

28. The apparatus according to claim 27, wherein said image processing unit performs dust erase processing for the image data which has undergone the rotation processing so as to make the dust particle unnoticeable using the information specifying the position of the portion of interest changed by said change unit.

29. A method of controlling an image processing apparatus for performing image processing of image data in which information specifying a position of a portion of interest in an image is recorded, comprising:
performing rotation processing of the image data; and
changing the information specifying the position of the portion of interest in accordance with a rotation amount of the image data by the rotation processing such that an image of the portion of interest specified by the information specifying the position of the portion of interest after the rotation processing is corresponding to that before the rotation processing,
wherein the portion of interest is a portion corresponding to a dust particle sticking.

30. The method according to claim 29, wherein
the image data is generated by an image capturing apparatus, and
the portion of interest is a portion corresponding to a dust particle sticking to an image sensor of the image capturing apparatus.

31. The method according to claim 30, further comprising performing dust erase processing for the image data which has undergone the rotation processing so as to make the dust particle unnoticeable using the information specifying the position of the portion of interest changed in the changing step.

32. A non-transitory computer-readable storage medium storing a program for causing a computer to execute a method of controlling an image processing apparatus for performing image processing of image data in which information specifying a position of a portion of interest in an image is recorded, the program causing the computer to execute:
performing rotation processing of the image data; and
changing the information specifying the position of the portion of interest in accordance with a rotation amount of the image data by the rotation processing such that an image of the portion of interest specified by the information specifying the position of the portion of interest after the rotation processing is corresponding to that before the rotation processing, wherein the portion of interest is a portion corresponding to a dust particle sticking.

33. The medium according to claim 18, wherein the image data is generated by an image capturing apparatus, and the portion of interest is a portion corresponding to a dust particle sticking to an image sensor of the image capturing apparatus.

34. The medium according to claim 33, wherein the program causing the computer to execute processing for the image data which has undergone the rotation processing so as to make the dust particle unnoticeable using the information specifying the position of the portion of interest changed in the changing step.

* * * * *